(12) United States Patent
Hicken et al.

(10) Patent No.: US 10,679,246 B2
(45) Date of Patent: Jun. 9, 2020

(54) SELECTING ADVERTISEMENTS FROM ONE OR MORE DATABASES FOR SENDING TO A PUBLISHER

(71) Applicant: YellowPages.com LLC, Tucker, GA (US)

(72) Inventors: Wendell Hicken, La Verne, CA (US); Joshua Melick, Oakland, CA (US)

(73) Assignee: THRYV, INC., D/FW Airport, TX (US)

( * ) Notice: Subject to any disclaimer, the term of this patent is extended or adjusted under 35 U.S.C. 154(b) by 342 days.

(21) Appl. No.: 15/648,658

(22) Filed: Jul. 13, 2017

(65) Prior Publication Data

US 2017/0330227 A1    Nov. 16, 2017

Related U.S. Application Data

(63) Continuation of application No. 12/940,976, filed on Nov. 5, 2010, now abandoned.

(51) Int. Cl.
*G06Q 30/00* (2012.01)
*G06Q 30/02* (2012.01)

(52) U.S. Cl.
CPC .................. *G06Q 30/0251* (2013.01)

(58) Field of Classification Search
None
See application file for complete search history.

(56) References Cited

U.S. PATENT DOCUMENTS

| | | |
|---|---|---|
| 5,930,474 A | 7/1999 | Dunworth et al. |
| 7,668,832 B2 | 2/2010 | Yeh |
| 7,690,466 B2 | 3/2010 | Benbrahim et al. |
| 7,774,348 B2 | 8/2010 | Delli Santi et al. |
| 7,801,897 B2 | 9/2010 | Egnor |
| 8,239,273 B1 | 8/2012 | Marshall et al. |
| 8,370,197 B2 | 2/2013 | Axe et al. |
| 8,577,016 B1 | 11/2013 | Duva et al. |
| 8,781,105 B1 | 7/2014 | Duva et al. |
| 2002/0049635 A1 | 4/2002 | Mai et al. |
| 2002/0123984 A1 | 9/2002 | Prakash |
| 2004/0073693 A1 | 4/2004 | Slater et al. |
| 2004/0093327 A1 | 5/2004 | Anderson et al. |
| 2005/0055337 A1 | 3/2005 | Bebo et al. |
| 2006/0149774 A1 | 7/2006 | Egnor |
| 2006/0242017 A1 | 10/2006 | Libes et al. |
| 2006/0277108 A1 | 12/2006 | Altberg et al. |
| 2007/0100834 A1 | 5/2007 | Landry et al. |
| 2007/0161382 A1 | 7/2007 | Melinger et al. |
| 2007/0162334 A1 | 7/2007 | Altberg et al. |
| 2007/0233577 A1 | 10/2007 | Glass |
| 2007/0288437 A1 | 12/2007 | Xia |
| 2008/0059298 A1 | 3/2008 | Waag et al. |
| 2008/0270164 A1 | 10/2008 | Kidder et al. |
| 2009/0144068 A1 | 6/2009 | Altberg et al. |
| 2009/0187459 A1 | 7/2009 | Hayes, Jr. et al. |
| 2009/0247193 A1 | 10/2009 | Kalavade |

(Continued)

*Primary Examiner* — Yehdega Retta

(74) *Attorney, Agent, or Firm* — Greensfelder, Hemker & Gale, P.C.; Mark E. Stallion

(57) ABSTRACT

An advertising system determines the context of a user accessing a publication media (e.g., an online web site). The advertising system retrieves candidate advertisements from one or more databases based on the user's context (e.g., a user search request). The advertising system selects particular advertisements and then sends them to the user (e.g. for display on the user's terminal or device).

17 Claims, 8 Drawing Sheets

(56) References Cited

U.S. PATENT DOCUMENTS

| | | |
|---|---|---|
| 2009/0299831 A1 | 12/2009 | Li et al. |
| 2010/0093441 A1 | 4/2010 | Rajaraman et al. |
| 2010/0250361 A1 | 9/2010 | Torigoe et al. |
| 2011/0125573 A1 | 5/2011 | Yonezaki et al. |
| 2011/0196733 A1 | 8/2011 | Li et al. |
| 2011/0213741 A1 | 9/2011 | Shama et al. |
| 2011/0275047 A1 | 11/2011 | Gomes et al. |
| 2011/0295628 A1 | 12/2011 | Priyadarshan et al. |
| 2012/0078742 A1 | 3/2012 | Oleen |
| 2012/0078938 A1 | 3/2012 | Davis et al. |
| 2012/0116872 A1 | 5/2012 | Hicken et al. |
| 2012/0179568 A1 | 7/2012 | Soroca et al. |
| 2013/0124259 A1 | 5/2013 | Chourey et al. |
| 2013/0129060 A1 | 5/2013 | Gopalakrishnan et al. |
| 2013/0254035 A1 | 9/2013 | Ramer et al. |
| 2013/0297442 A1 | 11/2013 | Simons et al. |
| 2014/0012678 A1 | 1/2014 | Hayes, Jr. |
| 2014/0222551 A1 | 8/2014 | Jain et al. |

FIGURE 3 bing

Web | Images | Videos | Shopping | News | Maps | More | MSN | Windows Live restaurants san francisco, CA 🔍

ALL RESULTS — Businesses • Not what you wanted?                                                   Sort by: Best match | Distance | Rating Local

RELATED CATEGORY

Restaurants (9181)
American & Ca...(1377)
Taverns, Bars...(1123)
Bars, Grills &...(755)
European Resta...(685)
Italian Restau...(353)
Banquet Facili...(295)
United States ...(193)

⊕ RATING (MINIMUM)
⊕ PRICE (MAXIMUM)
⊕ CUISINE
⊕ ATMOSPHERE
⊕ RESERVATIONS
⊕ PAYMENT
⊕ PARKING

— 302

SPONSORED LISTINGS FROM YELLOWPAGES.COM™

Ⓐ Scoma's Fisherman's Wharf
Pier 43 1/2, San Francisco, CA • 2.09mi
(415) 771-4383 • Website
1-click directions Bella Vista Restaurant
13451 Skyline Blvd, Redwood City, CA
(650) 529-4316 • Website
1-click directions • Watch Video               } 308

Ⓑ North Beach Restaurant
1512 Stockton St, San Francisco, CA • 1.54mi
(415) 392-1700 • Website
1-click directions

— 304

ALL LISTINGS

① Ducca Restaurant & Lounge
50 3rd St, San Francisco, CA • 1.09mi
(415) 977-0271 • Website
Cuisine: Italian • Neighborhood: Financial District South
Price: $$$$ • Parking: Valet parking, Parking on site, Paid parking on site
Hours: Daily 6:30 am-10:30am, 11:30am-12:30am
★★★☆☆ • 280 Reviews • 1-click directions • Bird's eye ② Castagnola's Restaurant
286 Jefferson St, San Francisco, CA • 2.00mi
(415) 776-5015 • Website
Cuisine: Italian, Seafood • Neighborhood: Fisherman's Wharf
Price: $$ • Parking: Parking on site, Street parking, Paid parking on site
Hours: Daily 11am-10pm
★★★☆☆ • 39 Reviews • 1-click directions • Bird's eye • Menu

↖ 306

SELECTING ADVERTISEMENTS FROM ONE OR MORE DATABASES FOR SENDING TO A PUBLISHER

CROSS-REFERENCE TO RELATED APPLICATIONS

This application is a continuation application of U.S. application Ser. No. 12/940,976 filed Nov. 5, 2010, which is hereby incorporated herein in its entirety by reference.

FIELD OF THE TECHNOLOGY

At least some embodiments disclosed herein relate to advertising systems in general, and more particularly, but not limited to, selecting one or more advertisements from one or more databases for sending at least one advertisement to a publisher.

BACKGROUND

The Internet, cellular communication systems, television, newspaper, etc., provide diverse communication media channels through which people may receive information and/or communicate with one another.

For example, people may use a website to chronologically publish personal thoughts and web links Such a web site may be referred to as a blog. Another website may be used to search for information (e.g., Google's search website). Yet other websites may be used for interacting with online social networks (e.g., Facebook's social website).

When a user interacts with one of the foregoing websites, or others, using a user terminal or user device (e.g., a laptop computer or an iPhone telecommunication device), advertisements (sometimes referred to herein as simply "ads") are often presented for display to the user. These ads are sometimes presented in response to a user request (e.g., a search request), and in other cases are presented even without any particular request or action by the user (e.g., an ad presented when an webpage is first loaded onto a user's device).

Advertisements may also be presented to users (e.g., potential customers) that communicate using other forms of media. In addition to websites, users may receive information and communicate, for example, via cellular phones or other mobile devices, television or video devices, and even through traditional print media (e.g., where the user is a reader of the print media, and then later takes an action online using information found in the print media).

Publishers of the various foregoing forms of media often make decisions to select particular ads for particular users or readers. A publisher usually selects ads that will be most effective for attracting business from the user to the service or product provider that has sponsored an advertisement accompanying or presented during the user's interaction on or with the media.

BRIEF DESCRIPTION OF THE DRAWINGS

The embodiments are illustrated by way of example and not limitation in the figures of the accompanying drawings in which like references indicate similar elements.

FIG. 3 shows an example of a web page having advertisements according to one embodiment.

DETAILED DESCRIPTION

Figure 1:
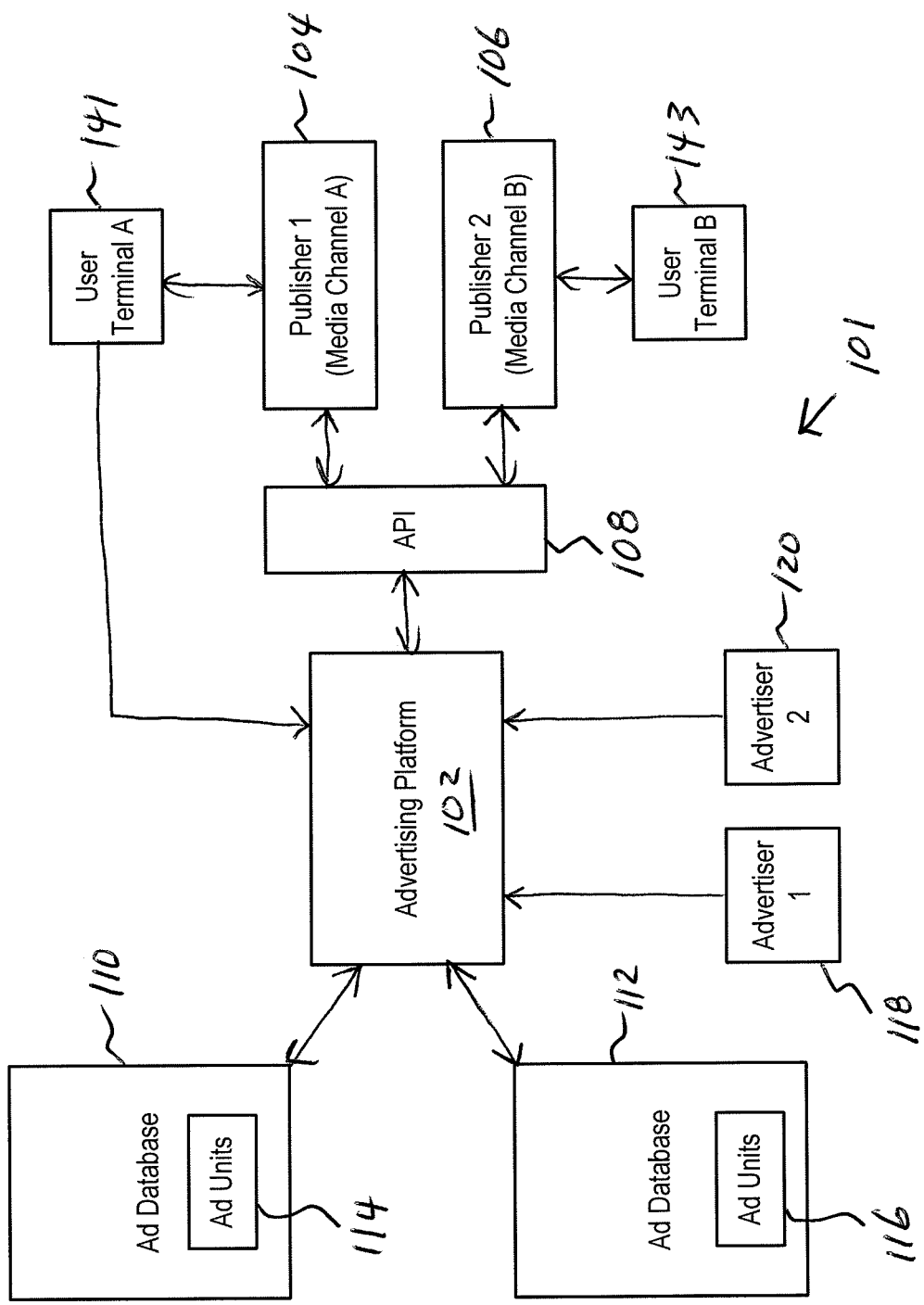
FIG. 1 shows a system for selecting an advertisement using an advertising platform and presenting the advertisement to a user according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

As used herein a "pay-per-call advertisement" is an advertisement for which some form of compensation is provided on a per call basis (e.g., a payment by a service provider for each call made to the service provider in response to an online advertisement seen by a user on a user terminal). For example, the compensation may be in the form of a cash payment or credit (e.g., made online via a computer system). Examples of pay-per-call advertisements and systems therefor are described in U.S. Patent Application Publication No. 2007/0162334, published Jul. 12, 2007 (titled "SYSTEMS AND METHODS TO CONVERT A CALL GENERATED FROM AN ADVERTISEMENT" by Altberg et al.), which is hereby incorporated by reference in its entirety.

Systems and methods to select one or more advertisements from one or more databases for sending at least one advertisement (e.g., as a set of advertisement units) to a publisher (e.g., through an application programming interface accessed by a computer server of the publisher) are described below. In one embodiment, a method implemented in a data processing system includes: determining a user context; retrieving, via the data processing system, candidate advertisements from at least one advertisement database to create an advertisement candidate pool, the retrieving based on the user context; selecting, via the data processing system, a set of advertisements from the advertisement candidate pool; and sending the set of advertisements.

The determining the user context may include identifying a user as belonging to a demographic category (e.g., a young mother), and the retrieving may be based on the demographic category (e.g., selecting advertisements for baby products or services). In one example, the set of advertisements are provided in reply to an ad request (also referred to sometimes as a specific ad call). The ad request may include a search term, location, and a number of ads requested. The location may be the user location, or may be another location provided by the publisher for other business reasons or goals.

In one embodiment, the determining the user context comprises receiving a first advertisement request comprising user search data corresponding to a search request of a user, where the user search data includes a search term. The retrieving is based on the search term, and the sending of the set of advertisements is in reply to the first advertisement request. In one embodiment, the user search data further includes a search location, and the retrieving is further based on the search location.

In one embodiment, the method further comprises logging performance data regarding user interactions with the set of advertisements, and adding the performance data to an historical performance database. The retrieving is performed further based on the data in the historical performance database (e.g., to improve advertisement effectiveness based on feedback from actual user purchases or contacts with advertisers). The method may include providing an annotation to each advertisement in the set of advertisements for use in tracking each respective advertisement, and receiving tracking data corresponding to each respective advertisement.

In one embodiment, the selecting of the set of advertisements comprises scoring advertisements in the advertisement candidate pool according to a ranking function. In one embodiment, the selecting the set of advertisements comprises selecting the set of advertisements using weighted advertisement rotation. In one embodiment, the selecting the set of advertisements comprises sorting advertisements in the advertisement candidate pool into at least a first bucket and a second bucket, and the selecting further comprises associating the first bucket with a higher advertisement selection priority than the second bucket.

In one embodiment, the at least one advertisement database comprises a first database and a second database, the first database storing subscription advertisements and the second database storing pay-per-call advertisements. The first advertisement request may be a request for a subscription advertisement from a first publisher. The method may further comprise receiving a second advertisement request for a pay-per-call advertisement from a second publisher, wherein the first and second requests are received using a common application programming interface (API) supported by the data processing system. This is in contrast to prior systems that use multiple APIs, one for each type of advertisement desired by a publisher.

In one embodiment, the sending the set of advertisements comprises sending the set of advertisements to a publisher, and the method further comprises eliminating advertisement candidates from consideration for the advertisement candidate pool that are not in compliance with business rules provided by the publisher prior to the retrieving. For example, a particular publisher may require that no adult product advertisements, or advertisements from particular competitors, be sent to the publisher.

In one embodiment, the method may further comprise receiving, via the data processing system, advertisements from an advertiser, and storing the advertisements from the advertiser in the at least one database. The first advertisement request is received through an application programming interface, and the advertisements from the advertiser are received, via a data processing system (e.g., a web server) of the publisher, through the application programming interface.

In another system embodiment, a data processing system includes memory (e.g., hard drives or flash memory) storing at least one advertisement database (e.g., two or more databases, each storing a particular format or type of advertisement record). The data processing system includes at least one processor coupled to access the memory (e.g. via local addressing, a local area network, or via a link over the Internet). The at least one processor is configured to determine a user context; retrieve candidate advertisements from the at least one advertisement database to in order to create an advertisement candidate pool, the retrieving based on the user context; select a set of advertisements from the advertisement candidate pool; and send the set of advertisements.

The disclosure below includes various methods and apparatuses which perform these methods, including data processing systems which perform these methods, and computer readable media containing instructions which when executed on data processing systems cause the systems to perform these methods. Other features will be apparent from the accompanying drawings and from the detailed description which follows.

FIG. 1 shows a system 101 for selecting one or more advertisements using an advertising platform 102 and presenting the advertisement(s) to a user (e.g., via a social media publisher's website) according to one embodiment. Publishers 104, 106 each may access advertising platform 102 via an application programming interface (API) 108. Publishers 104, 106 may send requests for advertisements to platform 102. These requests may relate in this embodiment to user requests by users operating user terminals 141, 143, in which one of the users makes a search request to a server of publisher 104 or 106. One example of a user request is a search request by a user seeking information about a particular topic (e.g., the user enters a text search term into an input device of a user terminal, which search term is sent by the publisher to advertising platform 102).

In response to the ad request sent to platform 102, one or more databases 110, 116 are queried in order to retrieve ads that may be suitable for responding to the ad request. Each database 110, 116 may store ad units 114, 116. Alternatively, only a portion of an ad unit may be stored in database 110, 116, and the ad units 114, 116 may be finally assembled by platform 102 just before sending to publishers 104, 106. In one example, database 110 stores pay-per-call advertisements, and database 112 stores subscription advertisements.

In one embodiment, database 116 stores a list of ads for each category/geographic combination associated with ad requests. This database provides, for example, candidate subscription ads for the advertising candidate pool 210 (see FIG. 2) discussed in more detail below. The user search data received from a publisher in an ad request includes a search location of a user on a user terminal. These ads are retrieved from the database at least in part based on this search location. The ad request also further includes the number of ads desired by the publisher.

The advertisements stored in databases 110, 116 may be provided from advertisers 118, 120. Advertisers 118, 120 may access platform 102 directly (e.g., via an API), or publishers 104, 106 may accept desired ads from advertisers 118, 120, and then publishers 104, 106 may provide the ads to platform 102 on behalf of advertisers 118, 120. Ads may also be provided from other sources.

In reply to the ad request, selected advertisements (e.g., in the form of ad units 114, 116) are sent to the requesting publisher 104 or 106. The selected ads are assembled by publishers 104, 106 into, for example, a web page that will be provided to a user in response to a user search request.

In general, publishers 104, 106 may maintain media channels of many various types including websites selling products or services, or social network websites, mobile media, cable and satellite television, video distribution, and print (e.g., newspapers and magazines). Advertising platform 102 may select advertisements from databases 114, 116 that are most appropriate for the media type of a publisher.

The advertisements sent to a publisher may correspond to various types of ad products including, for example, pay-per-call ads, presence ads, cost per click, or cost per impression. In one embodiment, advertising platform 102 is able to serve ad products (e.g., display ads, Internet Yellow Pages subscription ads, pay-per-call ads, cost-per-click/impression products) in different types of medium (e.g., print, web, mobile, video, television, and social) across multiple platforms (e.g., vendors, publishers, YP.com, and pay-per-call ads).

Figure 2:
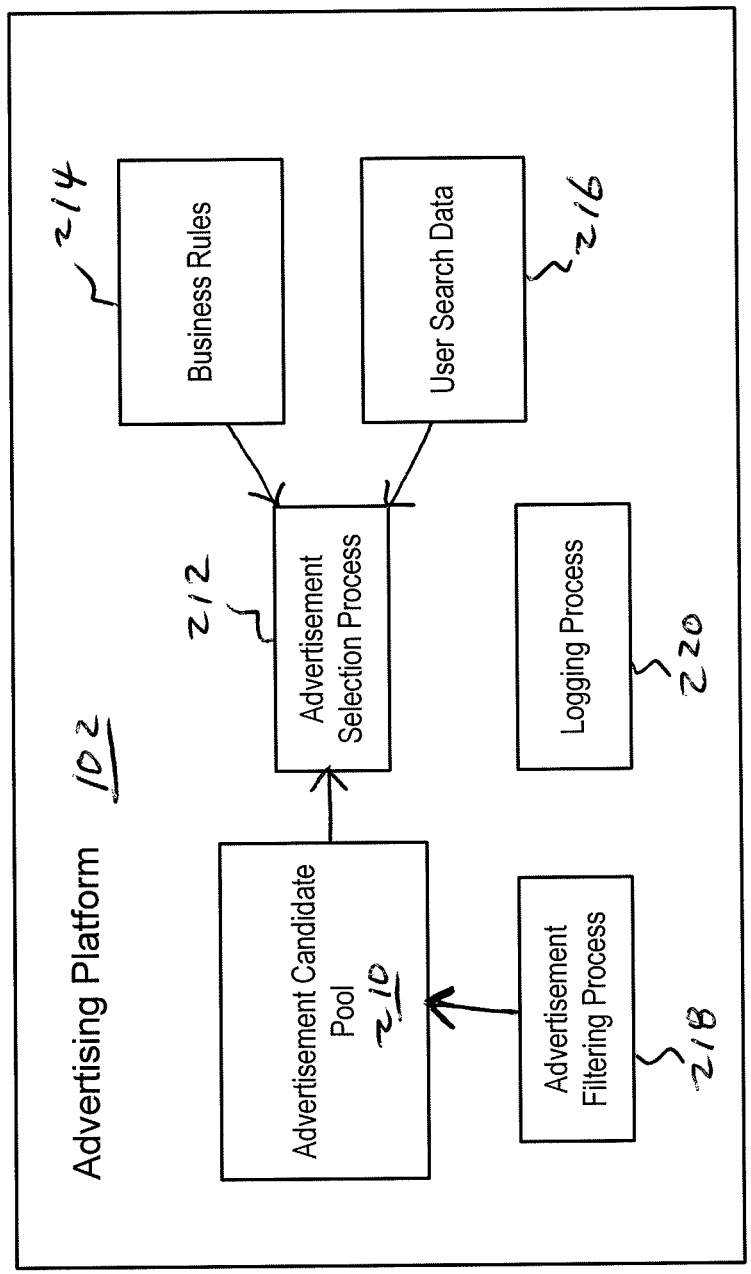
FIG. 2 shows the structure of an advertising platform according to one embodiment.

FIG. 2 shows the structure of advertising platform 102 according to specific one embodiment. Ads retrieved from databases 110 and 112 are assembled into an initial candidate pool 210. These are ads that are expected to be eligible for use with the ad request from publisher 104, 106.

An advertisement filtering process 218 runs on platform 102, and may use logic stored on platform 102 to narrow or reduce the size of the initial candidate pool. For example, filtering process 218 may narrow the pool based on particular configuration requests or characteristics of a given publisher. The narrowed ad pool thereby provides a set of ad listings that will be the final candidate pool from which ads are selected for sending to a requesting publisher 104, 106.

An advertisement selection process 212 runs on platform 102 and is applied to the final candidate pool that was obtained from the filtering process 218 above. In one embodiment, selection process 212 sorts and rotates candidate ads in candidate pool 210 with varying algorithms. This sorting, rotation, and particular algorithms may be configured for each particular publisher that interacts with platform 102.

Selection process 212 may use user search data 216, which is obtained from a publisher based on a search request from a user, to customize the particular ads that will be sent to a publisher. Also, business rules 214 may be used by selection process 212 in order to determine an ordering or priority with which ads will be sent from candidate pool 210 to a publisher. These business rules 214 may be provided by a publisher, for example, when configuring an account for the publisher with advertising platform 102, and also may be periodically updated by the publisher. Business rules 214 may place restrictions on the types or categories of ads that may be sent to a publisher in response to ad requests.

In one embodiment, advertisement selection process 212 chooses which, if any, of the available ads in candidate pool 210 should be shown for a given ad request. The considerations may include relevance (e.g., what is the applicable user looking for or interested in), as well as business rules 214 (e.g., rules related to the amount paid by a certain advertiser for the showing of its ads).

In this embodiment, when a large ad pool 210 is present, the pool 210 is narrowed down to minimize the amount of processing required by platform 210. In some embodiments, to all of the candidate ads are scored according to some ranking function, the list of all ads is sorted by that score, and then ads are selected from the top of this list as needed to satisfy an ad request. In some embodiments, further details may be used to narrow the list of ads, including eliminating ads that have already been shown to the specific user associated with the ad request.

An example of a scoring algorithm is one based on the cost that the advertiser is willing to pay for advertisements. The advertisers that pay the highest amount will have their ads appear most often. For a cost-per-impression (CPM) ad product, this is readily implemented. For a performance product (e.g., a pay-per-click advertising model, etc.), the business value depends on the likelihood that the user will click on the ad, multiplied by the revenue value of the click. In such a scenario, identifying ads that the user is most likely to click may be a key part of the scoring function. As platform 102 is better able to predict click-through rates, the more readily platform 102 can optimize ad impressions to increase revenue.

A logging process 220 may also run on platform 102. Performance data may be received and logged that indicates and records (in historical data records for future reference) the manner in which a user interacts with the advertisements that were sent to the publisher (and that are ultimately viewed by the user). This data may be added to an historical performance database stored at or accessible by platform 102. The retrieving of ads from databases 110, 112 may further be based on the data in the historical performance database. An annotation may be provided on each advertisement in the set of advertisements sent to the publisher for use in tracking each advertisement. The tracking data corresponding to each advertisement may be received directly by advertising platform 102 or via data from a publisher.

As examples of tracking and logging, tracking data may be provided to platform 102 in call-backs from a publisher's server (e.g., including information about which ads the publisher decided to show to users), or in call-backs from an end user's Internet browser (e.g., when a tracking pixel is rendered on a display of the user terminal, or when the user clicks on a link having a click wrapper, the user's request is routed through a server of platform 102 before being forwarded to its final destination so that platform 102 is able to count and log the click).

For pay-per-call ads, calls may be logged in to a call center in communication with platform 102. Based on the phone number that was dialed by a user, platform 102 is able to track the call back to a publisher and advertiser. Historical tracking data may be used, for example, to determine user preferences such as that people don't like certain ads (maybe for unknown reasons). Future ad delivery and distribution curves may be adjusted based on this feedback.

FIG. 3 shows an example of a web page 302 having advertisements displayed to a user on a user terminal according to one embodiment. An advertising area 304 presents a listing of the set of advertisements sent from platform 102 to publisher 104, 106. Advertising area 304 includes a number of ad units 308. These correspond to, but are not necessarily identical to, ad units 114, 116 retrieved by, or finally assembled at, advertising platform 102. A set of listings 306 are non-sponsored (e.g., free) search results presented in response to a search request of a user viewing web page 302 on a user terminal 141.

Figure 4:
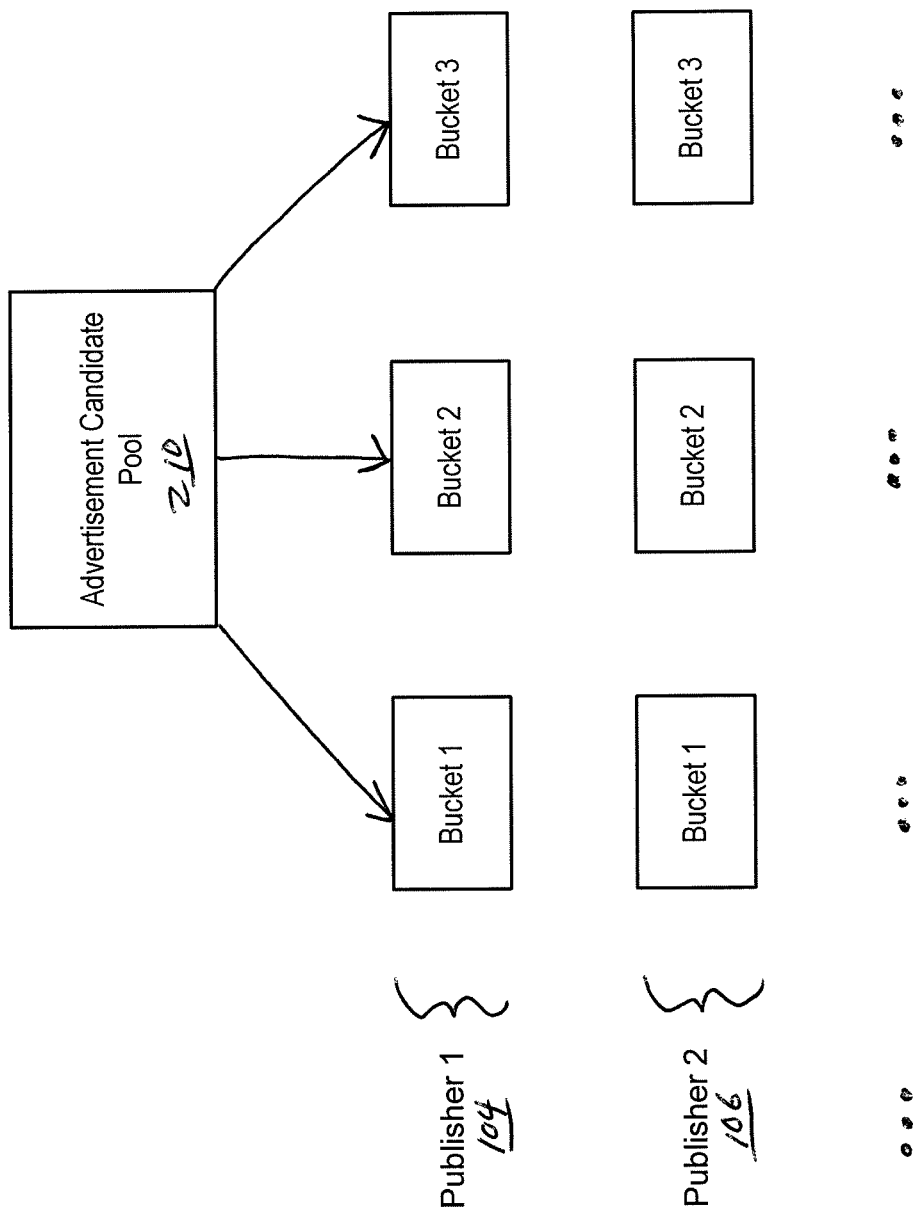
FIG. 4 shows the sorting of advertisements prior to sending to publishers according to one embodiment.

FIG. 4 shows the sorting of advertisements prior to sending to publishers according to one embodiment. The final ads in candidate pool 210 (after any use of filtering process 218) are sorted. In particular, layering is applied to the final ads in pool 210. The ads in pool 210 are sorted into different buckets (or layers) for each publisher. For example (Buckets 1, 2, 3 for publisher 104; or Buckets 1, 2, 3 for publisher 106).

Different priority levels are created (corresponding to each bucket) as to which ads should be sent to a publisher before other ads. For example, if it is desired that pay-per-call ads are sent first, then the pay-per-call (PPC) ads in the candidate pool 210 would be sorted into the first bucket (Bucket 1), and all other ads in pool 210 may be sorted into Bucket 2. Bucket 3 may be used for yet further sorting by another type of ad. In one embodiment, this sorting into buckets will always take precedence over any other rules when selecting ads to send in response to an ad request.

Now, within a particular bucket (e.g., Bucket 1), an intermediate sorting algorithm may be applied to further select a set of advertisements. The algorithm may be, for example, a weighted ad rotation algorithm (discussed in more detail below), or the assigning of tiers and points to the ads in candidate pool 210. Other sorting criteria may include sorting by yield or based on predictions of revenue for a particular advertisement.

Then, ads are selected primarily from the highest priority bucket (obtained from the intermediate sorting above) and used in a priority order. As one example, if three ads are needed for an ad request, and there are two buckets from the sorting above, then two ads may be taken from the first bucket and one ad from the second bucket in order to fulfill the ad request. The one ad from the second bucket would be based on the intermediate sorting logic being applied in that bucket (note that the intermediate sorting logic may be different for each bucket).

After the final ads for delivery are selected per the above approach, then a final sort may be done based on the particular business requirements of the publisher. These requirements may relate to any one of several sorting mechanisms. For a given publisher, the ads from a bucket may merely be randomized, or ads may be sorted by tiers and points (e.g., a point score based on certain business factors such as product features purchased) for contractual reasons, or there may be some other final sort order imposed on the set of advertisements sent to the publisher. In some embodiments, this final sorting may also include sorting by distance of a service (e.g., a restaurant) from a user's current location, or by spending data (e.g., higher spending by a particular publisher, thus providing higher revenues), or other factors such as conversion probability.

Figure 5:
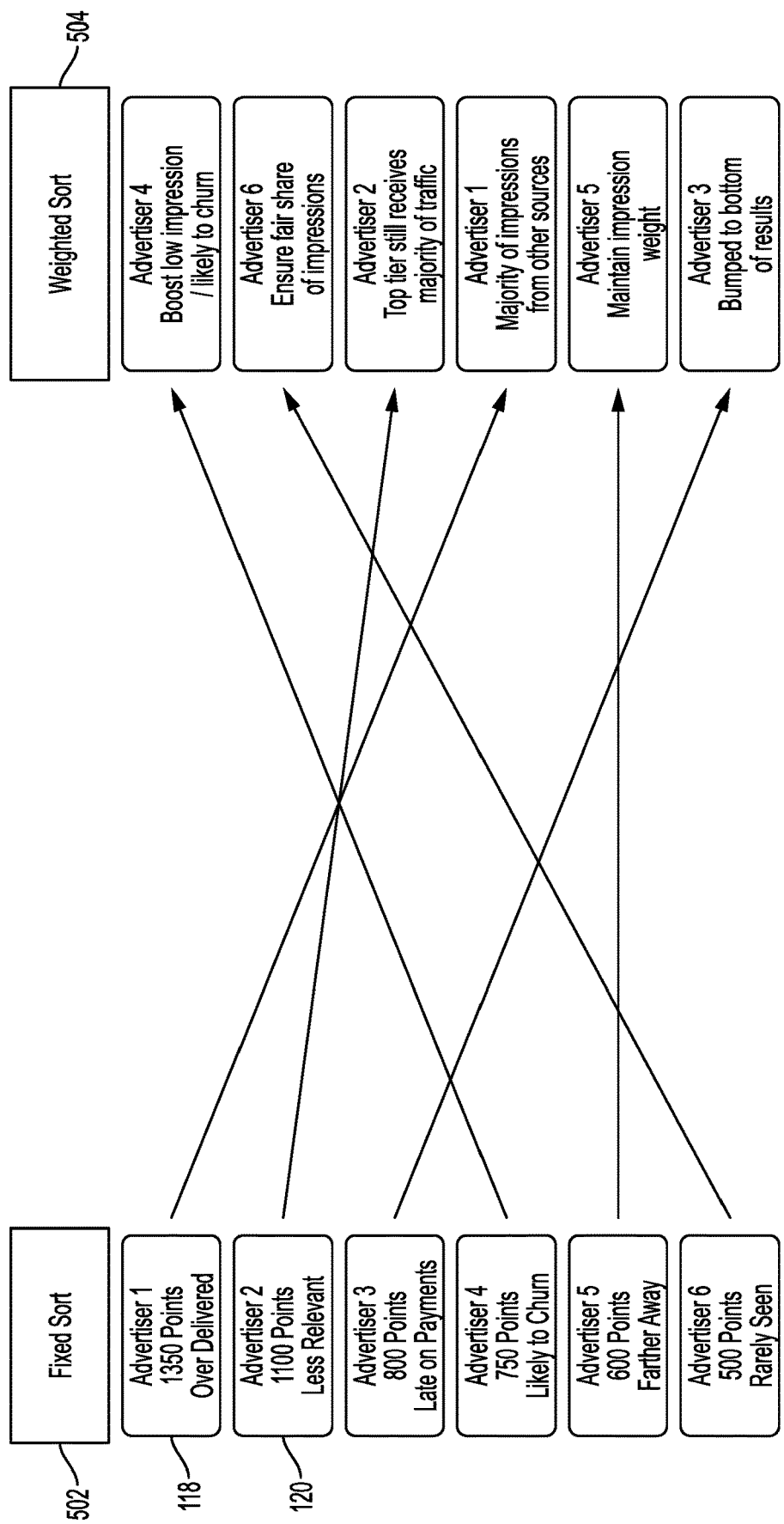
FIG. 5 shows an example of weighted advertisement rotation according to one embodiment.

FIG. 5 shows an example of weighted advertisement rotation according to one embodiment, which may be applied to advertisements in a given bucket (e.g., Bucket 1) as described above. A fixed sort 502 and a weighted sort 504 are illustrated—each sort may correspond to ads in a bucket from the sorting discussed above. In fixed sort 502, advertisers 118 and 120 are sorted based on a points score. In weighted sort 504 a weighted advertisement rotation is used that assigns weights to the ads based on relative spending by each advertiser, and rotates ad impressions based on that assigned weight (i.e., ads with higher weights receive more impressions). In one embodiment, ads that receive more (or less) total traffic relative to their assigned weights are sent to publishers in a manner so that they are given less (or more) impressions to users.

In one embodiment, the weights are based upon points, and the churn propensity for a given advertiser and the total click volume (across all traffic sources) can be used to vary the assigned weights up or down. Platform 102 may also segment advertising traffic by algorithm and/or by publisher to test the impact on traffic distribution curves across different configurations.

In another embodiment, ads from candidate pool 210 are sorted into different buckets. Based upon the spin of an ad and other factors, the ads are all weighted and then randomly picked from a bucket based upon these weights. For example, a given bucket may include both pay-per-call and subscription ads. Further, this approach can be turned on or off for each publisher.

In one embodiment, for fixed sort 502 each advertiser has a number of points based on the amount it is paying for its advertisement. For weighted sort 504 the order of the ads will be shifted around for various reasons (e.g., various reasons as discussed herein). Here, advertiser 4 is placed in the top slot for this particular search request. Advertiser 1 has already been delivered all of the impressions that were promised, so a lower ordering is used for this ad request.

In one embodiment, advertising platform 102 handles publisher and ad specific rules without requiring code changes by use of a configuration mechanism. At the configuration level rules may be defined on platform 102 for each publisher, for example, using JavaScript object notation (JSON). Some publishers may always place pay-per-call ads first because these achieve the best monetization. Other publishers may place subscription or other ads into the ad rotation so that there is rotation between two types of ads. Platform 102 lets each publisher control whether certain types of ads are boosted in priority over other types of ads. For example, ads from competitors may be placed fairly low into the ad mix (e.g., by putting these ads into a lower priority bucket, or mixing the ads in a bucket in with a lower weight). This may be handled through this configuration mechanism. In some embodiments, a publisher may only prefer ads which have phone numbers, or physical addresses, as the publisher may believe that these types of ads create more value for users visiting its website.

Figure 6:
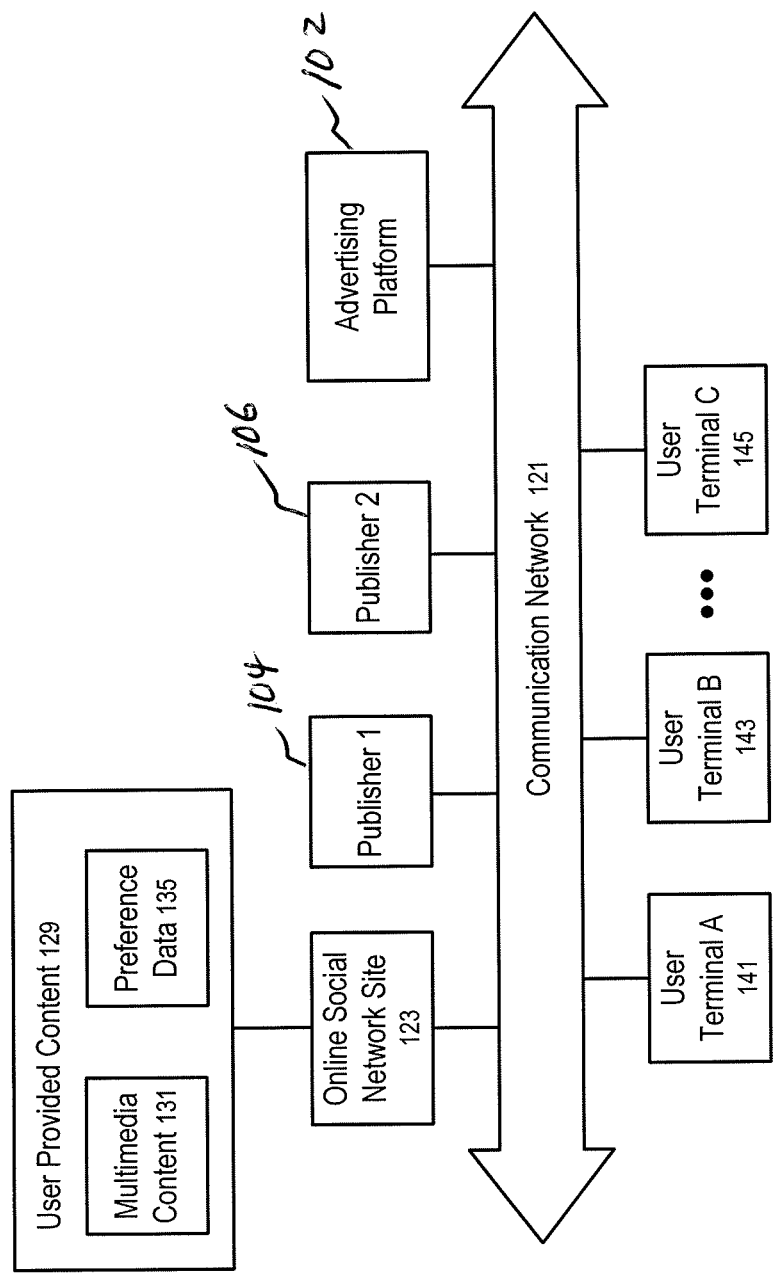
FIG. 6 shows a system for communications between user terminals, publishers, and the advertising platform of FIG. 1 according to one embodiment.

FIG. 6 shows a system for communications between user terminals, publishers, and the advertising platform 102 according to one embodiment. In FIG. 6, the user terminals (e.g., 141, 143, . . . , 145) are used to access websites of publishers 104 and 106 over a communication network 121 (e.g., the Internet, a local area network, or a wide area network).

The user terminals may also access other websites, for example an online social network site 123 over communication network 121. The user terminals may access yet other websites (not shown). Publishers 104 and/or 106 also communicate with advertising platform 102 over communication network 121. Advertising platform 102 may also communicate with ad databases 110, 112 over communication network 121. Advertising platform 102 sends advertisements to publishers 104, 106, which send a web page to a user terminal for display of the web page to the user, which includes one or more of these advertisements as determined by the publisher when rendering the web page for sending to the user terminal.

The publishers 104 and 106 and/or online social network site 123 may include one or more web servers (or other types of data communication servers) to communicate with the user terminals (e.g., 141, 143, . . . , 145). The online social network site 123 is connected to a data storage facility to store user provided content 129, such as multimedia content 131, preference data 135, etc.

In FIG. 6, the users may use the terminals (e.g., 141, 143, . . . , 145) to make implicit or explicit search or other requests for services. The user selections can be used as implicit recommendations. The publishers 104 or 106 may send information related to these requests to advertising platform 102. A search request may be seeking information regarding services at a certain location.

In one embodiment, the user terminal (e.g., 141, 143, . . . , 145) can also be used to submit multimedia content (e.g., 131). For example, in one embodiment, the user terminal includes a digital still picture camera, or a digital video camera. At a transition point, the user terminal can be used to create multimedia content for sharing with friends in the online social network 123.

Alternatively, the multimedia content can be created using a separate device and loaded into the online social network 123 using the user terminal (e.g., 141, 143, . . . , 145). The users may manually tag the multimedia content with personal data or data related to the user's current experience at a location.

Although FIG. 6 illustrates an example system implemented in client server architecture, embodiments of the disclosure can be implemented in various alternative architectures. For example, the publishers 104 and 106, and online social network 123 can be implemented via a peer to peer network of user terminals, where the multimedia content and other data are shared via peer to peer communication connections.

In some embodiments, a combination of client server architecture and peer to peer architecture can be used, in which one or more centralized server may be used to provide some of the information and/or services and the peer to peer network is used to provide other information and/or services. Thus, embodiments of the disclosure are not limited to a particular architecture.

Figure 7:
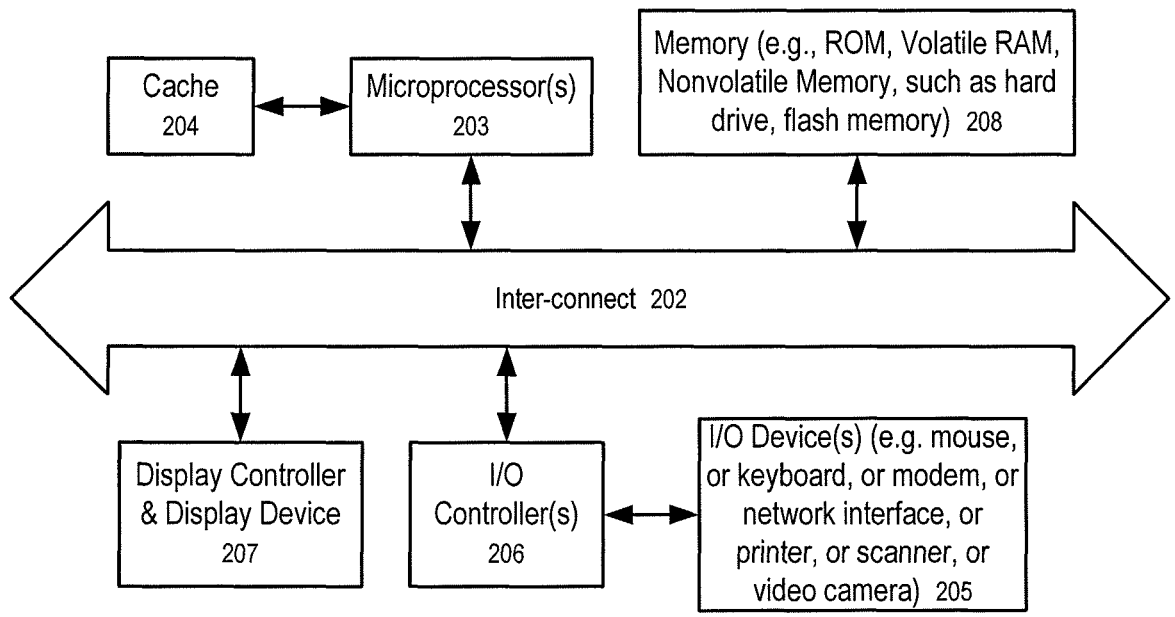
FIG. 7 shows a block diagram of a data processing system which can be used in various embodiments.

FIG. 7 shows a block diagram of a data processing system which can be used in various embodiments. While FIG. 7 illustrates various components of a computer system, it is not intended to represent any particular architecture or manner of interconnecting the components. Other systems that have fewer or more components may also be used.

In FIG. 7, the system 201 includes an inter-connect 202 (e.g., bus and system core logic), which interconnects a microprocessor(s) 203 and memory 208. The microprocessor 203 is coupled to cache memory 204 in the example of FIG. 7.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 7 is used to implement advertising platform 102, servers for publishers 104, 106, online social network site 123, and/or other servers, such as a server to support various advertisement databases.

In one embodiment, a data processing system as illustrated in FIG. 7 is used to implement a user terminal. A user terminal may be in the form of a personal digital assistant (PDA), a cellular phone, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 8:
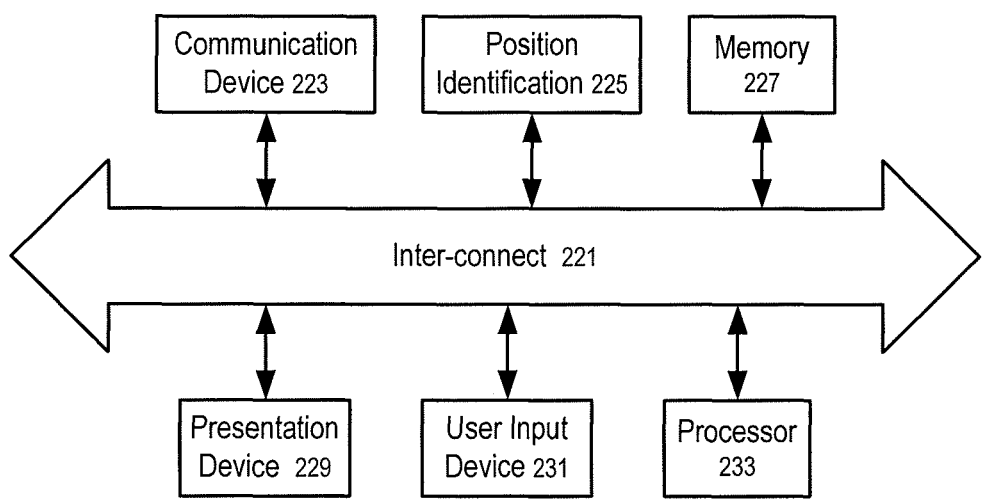
FIG. 8 shows a block diagram of a user terminal or device according to one embodiment.

FIG. 8 shows a block diagram of a user terminal or device according to one embodiment. In FIG. 8, the user device includes an inter-connect 221 connecting the presentation device 229, user input device 231, a processor 233, a memory 227, a position identification unit 225 and a communication device 223.

In FIG. 8, the position identification unit 225 is used to identify a geographic location of the user (e.g., a location may be provided to publisher 104 from user terminal 141 when a user makes a search request). The position identification unit 225 may include a satellite positioning system receiver, such as a Global Positioning System (GPS) receiver, to automatically identify the current position of the user device. Alternatively, an interactive map can be displayed to the user; and the user can manually select a location from the displayed map.

In FIG. 8, the communication device 223 is configured to communicate with publisher 104 or 106, or an online social network 123 to provide user data content tagged with other data provided by the user or automatically provided by the user terminal. The user input device 231 may include a text input device, a still image camera, a video camera, and/or a sound recorder, etc.

Figure 9:
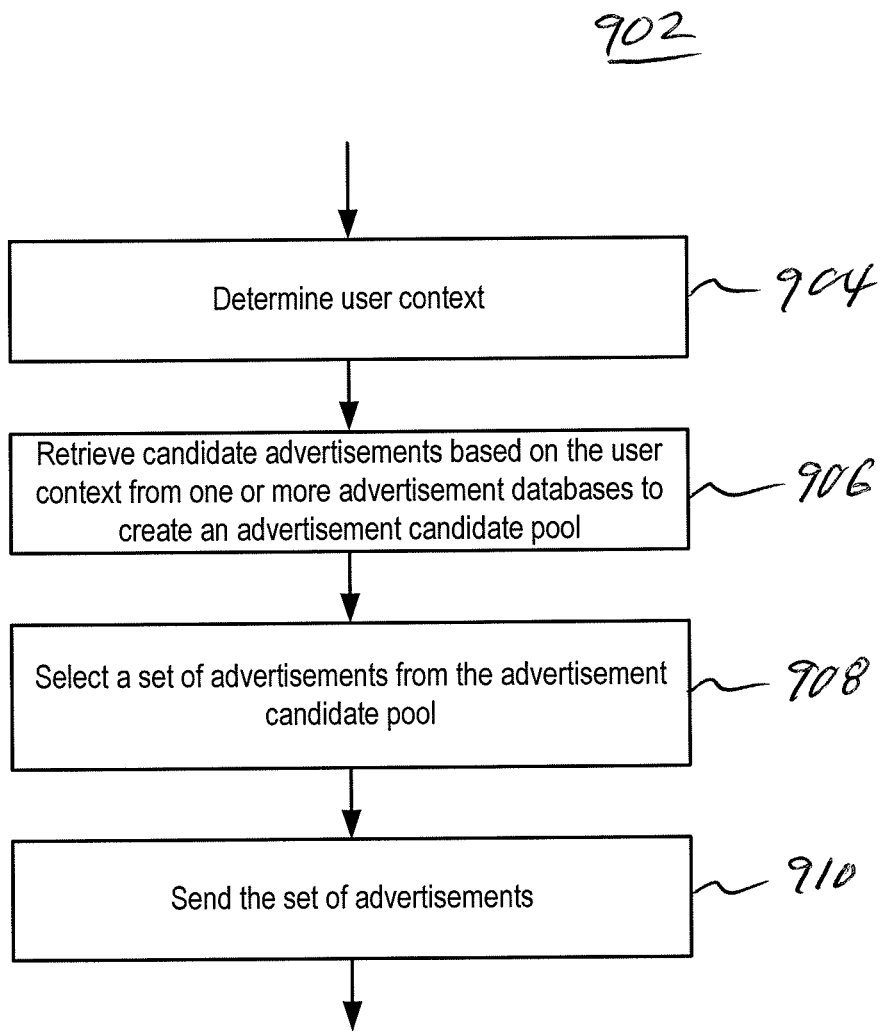
FIG. 9 shows a method to select an advertisement from at least one database using the advertising system of FIG. 1 according to one embodiment.

FIG. 9 shows a method 902 to select an advertisement from at least one database using advertising system 102 of FIG. 1 according to one embodiment. In block 904, a user context is determined. In block 906, advertising platform 102 retrieves candidate advertisements from one ore more advertisement databases to create an advertisement candidate pool. The user context is used in this retrieving.

In block 908, a set of advertisements is selected from the advertisement candidate pool (e.g., the ads are selected in order to reply to an ad request from a publisher prompted by a user search request). In block 910, the set of advertisements is sent from advertising platform 102 to publisher 104 or 106.

In one embodiment, in addition to selecting ads based on user context, the ad selection may be further based on user location. As an example of geographic relevance, consideration is given to how ads will perform for a given ad request in part based on the location of the user. For example, a distinction is made between direct and indirect matches so that if a user is searching for pizza in Glendale, then an ad for a pizza place in Glendale will perform better than an ad for a pizza place in a nearby city. So, a direct match (e.g., either a city name or a zip code) is given a higher priority over factors that are only an indirect match (this is direct and indirect layering).

In one embodiment, ads are generally selected so that the advertiser's location is closer to what the user is searching for. Advertisers only pay for presence when using subscription ad products, and not for specific impressions or specific value of any kind. So, the advertising space is expanded somewhat in order to distribute the ad traffic better for these particular advertisers. Although a pure distance sort might be best for conversions, it is not the most ideal for distributing advertising value.

One specific example of preparing a reply to an advertisement request from a publisher is now described. In this example, there are two types of ads (subscription and pay-per-call). A search request is received from a publisher, and the request includes some context about the ad that the publisher desires to show. Here, a user has made a request related to a terminal location using keywords such as "pizza", "restaurant", and "Glendale". These keywords are next turned into candidate ads as discussed above.

In this example, platform 102 implements processes related to its subscription ad listings. These keywords are run through a categorization process in which the word "pizza" is mapped into a category of "pizza restaurants", and may be further mapped to secondary categories of "Italian restaurants", etc. The location key word is mapped into a geography category.

Some ads are sold for limited service areas, and some ads are sold nationally. These categories and locations are used to do a reverse index search in order to retrieve ads that match the categories and locations. So, all ads under the category "pizza restaurants" becomes the initial candidate pool (i.e., this provides ad candidates for subscription ads). For pay-per-call ads, the keywords and the location are used to select pay-per-call ads (e.g., within a predetermined diameter or distance of a user location, or in a zip code associated with a particular business location). For example, further candidate ads are retrieved for an advertiser wanting customer calls within five miles of its business, and where the customer has used the word "pizza" in its search. These ads are added to the candidate pool.

In this example, a normalization process is applied to put all of the ads in the candidate pool on an equal footing so that any of the sorting/selection algorithms can work on any of the ad types in the ad candidate pool. Some de-duping may be applied to filter the results and other filtering performed as discussed above. For example, filtering may be done based on rules in which a publishers states it does not want any ads of a mature/adult nature, or it only wants ads with phone numbers because the publisher's business relies on mobile phone communications with customers. After filtering, a final ad candidate pool is obtained. The ad selection processes and algorithms described above are then applied to select a final set of advertisements for sending in reply to an advertisement request.

Prior to sending the final ads, the ad may go through a final step of preparing them for display. For example, for pay-per-call ads, the ads may go to another system in platform 102 that generates a call-tracking number that is appropriate for the publisher requesting the ads.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof Advertising Platform Example An example in one specific embodiment of advertising platform 102 is now discussed below. This example describes certain high-level aspects of the logic and flow used for ad delivery. Platform 102 may implement its logic in Java.

Initial Inputs

This section describes ways that advertising platform 102 may be called. This corresponds generally to a publisher passing a search term and search location in to platform 102.

After resolving parameters associated with these inputs, the following are obtained:
Publisher partner code
User search term
User search location
Search type: Name, Category, or Term. A "name" search term is interpreted as a business name. A "category" search term is interpreted as a category or keyword. A "term" search will be interpreted by platform 102 according to the "most likely" meaning.

Retrieving Candidate Ads

This section describes the initial step of collecting candidate ads from different ad sources. In this case, this includes details on how to take the search term and search location, and to get a list of the ads which are eligible for display. There are two sources (subscription and pay-per-call) described in more detail in each of the sections below. For a given publisher/ad request, one or both of the sources will be called to find candidate ads. If no candidate ads are returned, then no ads are sent to the publisher.

The first step is to find a set of candidate ads, which can be selected from. Based on the user search term and geography, candidates can be identified. There are two paths, which may be run in parallel: retrieving subscription ads and PPC ads. The two paths are described below. Note that depending on the publisher configuration, only one of the paths may be used.

Retrieving Subscription Ads

This section describes how to determine eligible subscription ads (listings).

First, an internal system is used to resolve the plain text search term and location into machine-usable information. Locations will be mapped into either lat/lon positions, or other common things like city and state, neighborhoods, or points of interest (e.g., major airports or landmarks).

The search term will be matched against both business names and categories, with the most likely interpretation being chosen. After analyzing the search term, it will be classified as either a category search, with a list of associated categories, or as a name search, with a list of associated businesses, or as an unknown term (in which case no ads will be returned).

Based on the determined geographies and categories, a list of relevant ads are retrieved from a high performance index which has been prepared to make such retrieval highly efficient.

Retrieving PPC Ads

This works in a similar fashion to the subscription ads, but using a system which has been tuned towards the pay-per-call model. For example, this will enforce hours of operation, so ads are not shown for businesses where the phones are not currently being manned, as calls to these numbers will generate no revenue. Furthermore, there may be budget issues where an advertiser only wants to spend a fixed amount of money, so their listings would not be available after they received a sufficient amount of calls.

Filtering Ads

Once the list of eligible ads is obtained from each source, there is extra business logic that may depend on the specific publisher that is requesting the ads. These filtering rules narrow the set of listings to the final candidate pool.

Filtering may occur during the retrieval step, if the filter is specific to subscription or PPC listings, or may occur after the ads have been combined into a single list. Platform 102 may support the following filtering options:
address required will filter out ads with no visible address.
phone_required will filter out ads with no visible phone number.
business_names will filter out ads with matching business names (this might be used to blacklist competitors from a specific publisher's sites).
strict_geo matching will filter out SUB ads if there was an explicit city or zip in the search, and the ad does not contain the same city or zip.

Selecting Ads

This section describes the step where the ads are put in the candidate pool, and chooses the ads that will be provided for this specific ad call (i.e., ad request). First, normalization is done to make sure that the business rules can be run regardless of the source of the ads. Next, bucketing, scoring, and sorting logic is used to obtain the final set of ads.

The first step in ad selection is normalizing the subscription and PPC ads. This includes analyzing PPC performance and bid prices, and deciding how these should be handled relative to subscription products.

Additional Filtering: Ad Selection may perform additional filtering steps:
De-duping. If any ads share the same business identifier, then only one of each matching listing will be kept. The one kept may be chosen randomly, to distribute traffic across the listings.

Backfill logic. For name searches, depending on the name_searches configuration option, name matches or category matches may be supported.

After normalization, the ad selection process is run.

The final set of selected ads will be annotated for tracking and logging purposes. By recording information about how decisions were made, one can do bucket tests to see how different algorithms are performing, or measure nuances in how the system is behaving.

Formatting Ads

This is the final detail after the ads are selected that will be shown—anything necessary to show the actual listing is retrieved to assemble the final ads. This includes all the metadata (e.g., tag lines, image URLs, etc.) as well as allocating call-tracking numbers.

Once the final set of ads is obtained for display, additional information is retrieved to include in the reply to the ad request. The method to get this information is different for subscription and PPC listings—platform 102 may perform these calls in parallel.

Logging

This is how data is logged about what happened with respect to the ads—it becomes the core of the feedback loop where platform 102 can learn and improve over time (as well as use for basic details like reporting results to advertisers and paying publishers).

First, all requests and information about those requests gets logged by writing a record describing the request to disk. This record includes a unique identifier (UUID) which will be used to join subsequent user activity to the initial request. For a system more similar to being real-time, these records may also broadcast events over UDP which can be monitored by other systems. The request record will be associated with a list of all the impressions which are being shown: either subscription or PPC.

Next, all user activity which can be tracked should also record that information. Clicks will generally go through a special "click wrapper", which records the information about the click, and forwards the user to the destination URL. Information about each click will be associated with the original request via the UUID which was created to identify the request.

Information about phone calls is tracked via CTNs (call tracking numbers). This can be used to measure the performance of the system as a whole.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
processing a user operating interface programmed at a publisher server thereby presenting on a user terminal, communicably connected to the publisher server, a graphical control object as a user advertisement request field configured for receiving a user advertisement request input, and generating and transmitting, by the user operating interface, a call to an application programming interface corresponding to the user advertisement request input to the graphical control object;
processing an advertisement platform, by a server system, the call originating from the application programming interface from the publisher server of a publisher, the call corresponding to the advertisement request;
responsive to processing the call, resolving from the call transmitted, with the processing advertisement platform, by the server system, a set of parameters for the user advertisement request comprising i) a publisher code for the publisher and ii) user search data corresponding to a search request received by the publisher server, the user search data comprising a search term;
based at least in part on resolving the set of parameters to obtain the publisher code, retrieving with the processing advertisement platform, by the server system, previously stored rules specified by the publisher and stored in a publisher account record configured on the server system by the processing advertisement platform, the retrieving previously stored rules comprising retrieving identifiers from a blacklist of competitors with respect to the publisher;
determining with the processing advertisement platform a user context, by the server system, based at least in part on the user search data by identifying one or more of a user demographic category and a user location from key terms contained in the search request;
retrieving, with the processing advertisement platform at the server system, candidate advertisements from advertisement databases of the server system thereby assembling an advertisement candidate pool and storing the advertisement candidate pool at the server system, wherein the retrieving the candidate advertisements i) is at least partially based on the user context comprising the search term and ii) further comprises:
retrieving a first set of one or more advertisements from a first database of the advertisement databases according to a first method, the first set of one or more advertisements corresponding to a first advertisement pricing model;
retrieving a second set of one or more advertisements from a second database of the advertisement databases according to a second method, the second set of one or more advertisements corresponding to a second advertisement pricing model, the retrieving the second set of one or more advertisements is based at least in part on i) a time corresponding to the retrieving and ii) hours of operation of businesses corresponding to the second set of one or more advertisements;
wherein:
the second method is different from the first method; and
each advertisement of the first set of one or more advertisements is different from each advertisement of the second set of one or more advertisements;
the retrieving the first set of one or more advertisements and the retrieving the second set of one or more advertisements comprises filtering out one or more advertisements based at least in part on one or more of the business identifiers from the blacklist of competitors with respect to the publisher;
selecting, by the server system, a third set of advertisements from the advertisement candidate pool based at least in part on the first set of one or more advertisements and the second set of one or more advertisements;
determining, by the server system, a priority order for the third set of advertisements from the advertisement candidate pool at least partially based on the previously stored rules specified by the publisher and the first or second advertisement pricing model, wherein:

the third set of advertisements from the advertisement candidate pool comprises a first advertisement from the first set of one or more advertisements from the first database and a second advertisement from the second set of one or more advertisements from the second database;

the priority order comprises a first priority level and a second priority level, wherein the first priority level is greater than the second priority level; and the determining comprises:

assigning the first priority level to the first advertisement at least partially based on the first advertisement corresponding to the first advertisement pricing model; and assigning the second priority level to the second advertisement at least partially based on the second advertisement corresponding to the second advertisement pricing model; and sending, to and displaying at the user terminal through the application interface and through the server system of the publisher with the processing advertisement platform, by the server system, at least a graphical user interface element representative of the first advertisement and the second advertisement based at least in part on the priority order in reply to the call from the server of the publisher.

2. The method of claim 1, wherein the user search data further includes a search location, and the retrieving is further based on the search location.

3. The method of claim 1, further comprising logging performance data regarding user interactions with the set of advertisements, adding the performance data to an historical performance database, and wherein the retrieving is further based on data in the historical performance database.

4. The method of claim 1, wherein the selecting the set of advertisements comprises scoring advertisements in the advertisement candidate pool according to a ranking function.

5. The method of claim 4, wherein the selecting the set of advertisements comprises selecting the set of advertisements using weighted advertisement rotation.

6. The method of claim 1, wherein the selecting the set of advertisements comprises sorting advertisements in the advertisement candidate pool into at least a first bucket and a second bucket, and the selecting further comprises associating the first bucket with a higher advertisement selection priority than the second bucket.

7. The method of claim 1, further comprising providing an annotation to each advertisement in the set of advertisements for use in tracking the respective advertisement, and receiving tracking data corresponding to each respective advertisement.

8. The method of claim 1, wherein the at least one advertisement database comprises a first database and a second database, the first database storing subscription advertisements and the second database storing pay-per-call advertisements, wherein the subscription advertisements correspond to one of the first advertisement pricing model and the second advertisement pricing model, and the pay-per-call advertisements correspond to another of the of the first advertisement pricing model and the second advertisement pricing model.

9. The method of claim 8, wherein the first advertisement request is a request for a subscription advertisement from a first publisher, and the method further comprising receiving a second advertisement request for a pay-per-call advertisement from a second publisher, wherein the first and second requests are received using a common application programming interface supported by the data processing system.

10. The method of claim 1, wherein the determining the user context comprises identifying a user as belonging to a demographic category, and wherein the retrieving is based on the demographic category.

11. The method of claim 6, wherein the sending at least the first advertisement of the set of advertisements comprises sending the at least the first advertisement of set of advertisements to a publisher, and the method further comprising eliminating advertisement candidates from consideration for the advertisement candidate pool that are not in compliance with business rules provided by the publisher prior to the retrieving.

12. The method of claim 11, further comprising receiving, via the data processing system, advertisements from an advertiser, and storing the advertisements from the advertiser in the at least one database.

13. The method of claim 12, wherein the first advertisement request is received through an application programming interface, and the advertisements from the advertiser are received, via a data processing system of the publisher, through the application programming interface.

14. A non-transitory computer-readable storage medium for tangibly storing thereon computer-readable instructions, the computer-readable instructions causing a server system to perform a method, the method comprising:

processing a user operating interface programmed at a publisher server thereby presenting on a user terminal, communicably connected to the publisher server, a graphical control object as a user advertisement request field configured for receiving a user advertisement request input, and generating and transmitting, by the user operating interface, a call to an application programming interface corresponding to the user advertisement request input to the graphical control object;

processing an advertisement platform, by the server system, the call originating from the application programming interface from the publisher server of a publisher, the call corresponding to the advertisement request;

responsive to processing the call, resolving from the call transmitted, with the processing advertisement platform, by the server system, a set of parameters for advertisement request comprising i) a publisher code for the publisher and ii) user search data corresponding to a search request received by the publisher server, the user search data comprising a search term;

based at least in part on resolving the set of parameters to obtain the publisher code, retrieving with the processing advertisement platform, by the server system, previously stored rules specified by the publisher and stored in a publisher account record configured on the server system by the processing advertisement platform, the retrieving previously stored rules comprising retrieving identifiers from a blacklist of competitors with respect to the publisher;

determining with the processing advertisement platform a user context, by the server system, based at least in part on the user search data by identifying one or more of a user demographic category and a user location from key terms contained in the search request;

retrieving, with the processing advertisement platform at the server system, candidate advertisements from advertisement databases of the server system thereby assembling an advertisement candidate pool and storing the advertisement candidate pool at the server system, the retrieving the candidate advertisements i) is based at least on the user context comprising the search term and ii) further comprises:
retrieving a first set of one or more advertisements from a first database of the advertisement databases according to a first method, the first set of one or more advertisements corresponding to a first advertisement pricing model;
retrieving a second set of one or more advertisements from a second database of the advertisement databases according to a second method, the second set of one or more advertisements corresponding to a second advertisement pricing model, the retrieving the second set of one or more advertisements is based at least in part on i) a time corresponding to the retrieving and ii) hours of operation of businesses corresponding to the second set of one or more advertisements;
wherein:
the second method is different from the first method; and
each advertisement of the first set of one or more advertisements is different from each advertisement of the second set of one or more advertisements;
the retrieving the first set of one or more advertisements and the retrieving the second set of one or more advertisements comprises filtering out one or more advertisements based at least in part on one or more of the business identifiers from the blacklist of competitors with respect to the publisher;
selecting, by the server system, a third set of advertisements from the advertisement candidate pool based at least in part on the first set of one or more advertisements and the second set of one or more advertisements;
determining, by the server system, a priority order for the third set of advertisements from the advertisement candidate pool at least partially based on the previously stored rules specified by the publisher and the first or second advertisement pricing model, wherein:
the third set of advertisements from the advertisement candidate pool comprises a first advertisement from the first set of one or more advertisements from the first database and a second advertisement from the second set of one or more advertisements from the second database;
the priority order comprises a first priority level and a second priority level, wherein the first priority level is greater than the second priority level; and
the determining comprises:
assigning the first priority level to the first advertisement at least partially based on the first advertisement corresponding to the first advertisement pricing model; and
assigning the second priority level to the second advertisement at least partially based on the second advertisement corresponding to the second advertisement pricing model; and
sending, to and displaying at the user terminal through the application interface and through the server system of the publisher with the processing advertisement platform, by the server system, at least a graphical user interface element representative of the first advertisement and the second advertisement based at least in part on the priority order in reply to the call from the server of the publisher.

15. The non-transitory computer-readable storage medium of claim 14, wherein the user search data further includes a search location, and the retrieving is further based on the search location.

16. The non-transitory computer-readable storage medium of claim 14, wherein
the selecting the set of advertisements comprises sorting advertisements in the advertisement candidate pool into at least a first bucket and a second bucket,
the first bucket having a higher advertisement selection priority than the second bucket, and
the selecting further comprises selecting the set of advertisements using weighted advertisement rotation.

17. A server system comprising:
An advertisement database;
One or more servers coupled to access the memory, the one or more servers configured to:
process a user operating interface programmed at a publisher server to thereby present on a user terminal, communicably connected to the publisher server, a graphical control object as a user advertisement request field configured for receiving a user advertisement request input, and generating and transmitting, by the user operating interface, a call to an application programming interface corresponding to the user advertisement request input to the graphical control object;
process an advertisement platform, by a server system, the call originating from the application programming interface from the publisher server of a publisher, the call corresponding to the advertisement request;
responsive to processing the call, resolve from the call transmitted, with the processing advertisement platform a set of parameters for advertisement request comprising i) a publisher code for the publisher and ii) user search data corresponding to a search request received by the publisher server, the user search data comprising a search term;
based at least in part on resolving the set of parameters to obtain the publisher code, retrieve with the processing advertisement platform, by the server system, previously stored rules specified by the publisher and stored in a publisher account record configured on the server system by the processing advertisement platform, the retrieving previously stored rules comprising retrieving identifiers from a blacklist of competitors with respect to the publisher;
determine with the processing advertisement platform a user context based at least in part on the user search data by identifying one or more of a user demographic category and a user location from key terms contained in the search request;
retrieve with the processing advertisement platform at the server system, candidate advertisements from at least two of the advertisement databases of the server system thereby assembling an advertisement candidate pool and storing the advertisement candidate pool at the server system, the retrieving the candidate advertisements i) is based at least on the user context comprising the search term and ii) further comprises:
retrieving a first set of one or more advertisements from a first database of the advertisement databases according to a first method, the first set of one or more advertisements corresponding to a first advertisement pricing model;

retrieving a second set of one or more advertisements from a second database of the advertisement databases according to a second method, the second set of one or more advertisements corresponding to a second advertisement pricing model, the retrieving the second set of one or more advertisements is based at least in part on i) a time corresponding to the retrieving and ii) hours of operation of businesses corresponding to the second set of one or more advertisements;

wherein:
the second method is different from the first method; and
each advertisement of the first set of one or more advertisements is different from each advertisement of the second set of one or more advertisements;

the retrieving the first set of one or more advertisements and the retrieving the second set of one or more advertisements comprises filtering out one or more advertisements based at least in part on one or more of the business identifiers from the blacklist of competitors with respect to the publisher;

select a third set of advertisements from the advertisement candidate pool based at least in part on the first set of one or more advertisements and the second set of one or more advertisements;

determine a priority order for the third set of advertisements from the advertisement candidate pool at least partially based on the previously stored rules specified by the publisher and the first or second advertisement pricing model, wherein:

the third set of advertisements from the advertisement candidate pool comprises a first advertisement from the first set of one or more advertisements from the first database and a second advertisement from the second set of one or more advertisements from the second database;

the priority order comprises a first priority level and a second priority level, wherein the first priority level is greater than the second priority level; and the determining comprises:
assigning the first priority level to the first advertisement at least partially based on the first advertisement corresponding to the first advertisement pricing model; and
assigning the second priority level to the second advertisement at least partially based on the second advertisement corresponding to the second advertisement pricing model; and send, to and displaying at the user terminal through the application interface and through the server system of the publisher with the processing advertisement platform, by the server system at least a graphical user interface element representative of the first advertisement and the second advertisement based at least in part on the priority order in reply to the call from the server of the publisher.

* * * * *